No. 735,117. PATENTED AUG. 4, 1903.
E. S. LAFFERTY.
TILE MOLDING MACHINE.
APPLICATION FILED JAN. 22, 1902.
NO MODEL. 2 SHEETS—SHEET 2.
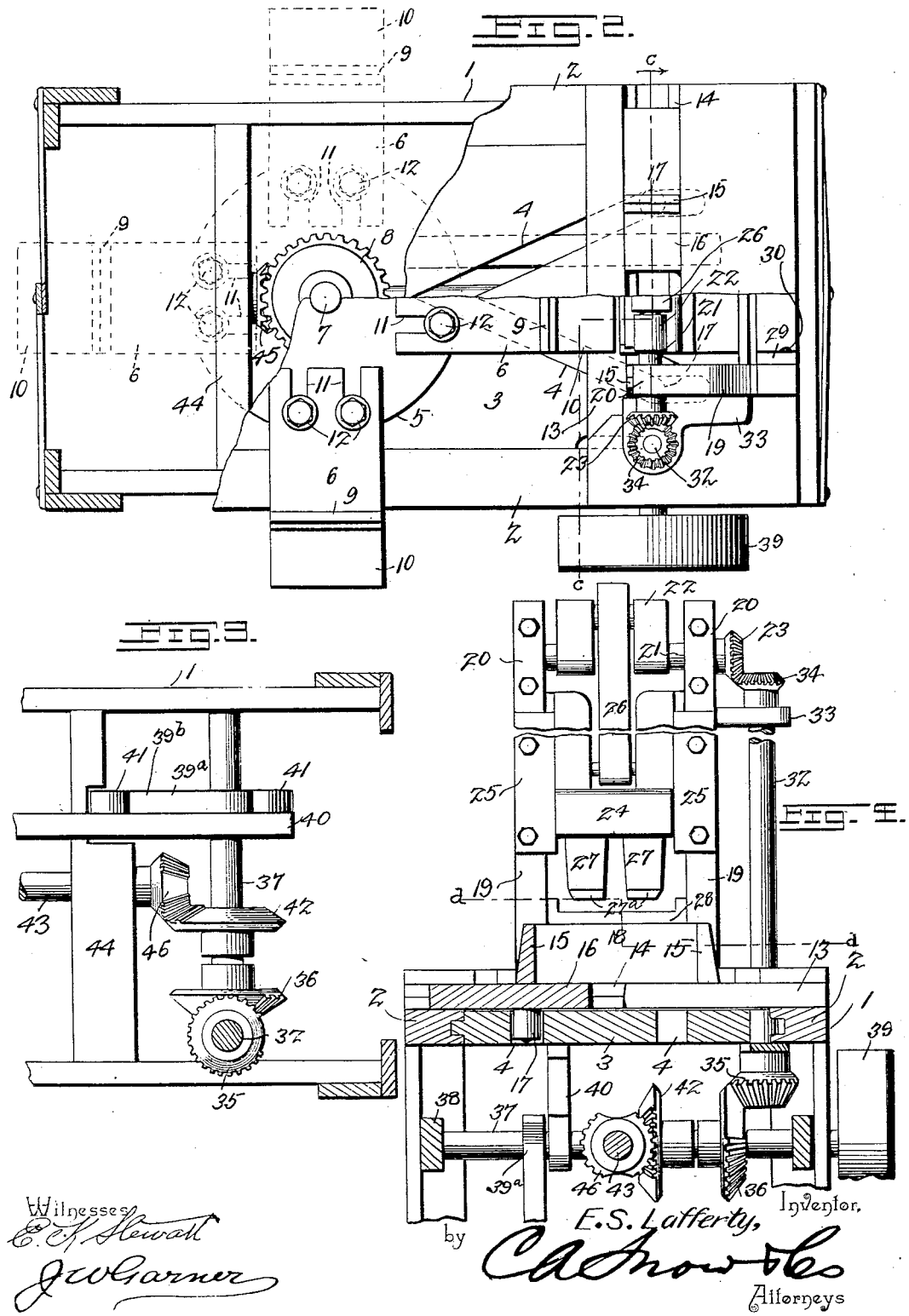
Witnesses
E. K. Stewart
J. W. Garner
Inventor,
E. S. Lafferty,
by C. A. Snow & Co.
Attorneys No. 735,117. Patented August 4, 1903.

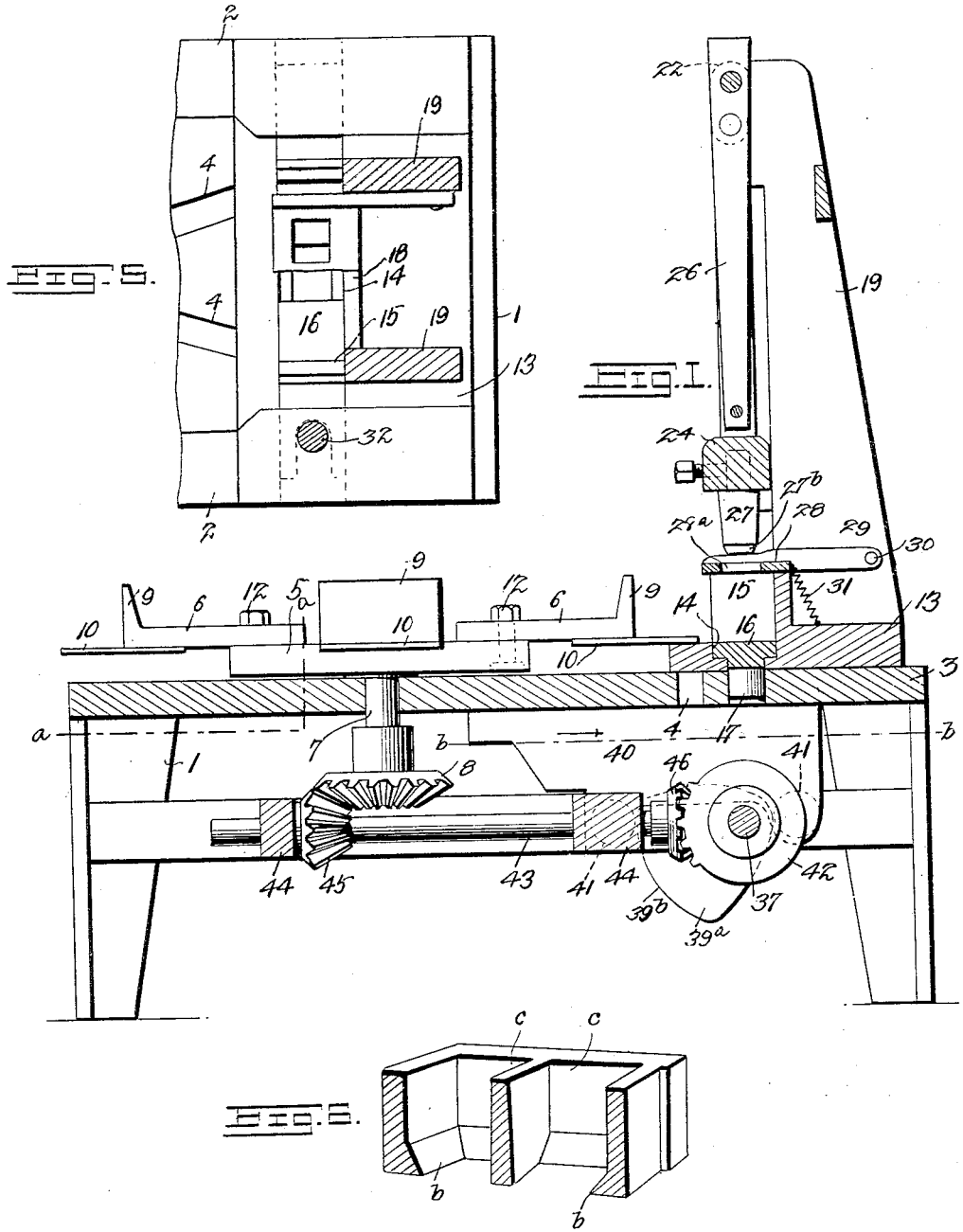

UNITED STATES PATENT OFFICE.

ERASTUS SIMMONS LAFFERTY, OF GALESBURG, ILLINOIS.

TILE-MOLDING MACHINE.

SPECIFICATION forming part of Letters Patent No. 735,117, dated August 4, 1903.

Application filed January 22, 1902. Serial No. 90,844. (No model.)

*To all whom it may concern:*

Be it known that I, ERASTUS SIMMONS LAFFERTY, a citizen of the United States, residing at Galesburg, in the county of Knox and State of Illinois, have invented a new and useful Tile-Molding Machine, of which the following is a specification.

My invention is an improved machine for molding tiles, building-blocks, bricks, and other similar articles; and it consists in the peculiar construction and combination of devices hereinafter fully set forth and claimed.

One object of my invention is to combine with the mold a feed element movable to and from the same to convey the material to the mold and remove the molded article and a plunger coacting with the mold to form the article therein.

A further object of my invention is to combine with a mold a removable feed element on which the material to be molded is placed and which element forms a portion of the mold.

A further object of my invention is to combine with a mold and a plunger a trimmer element forming one side of the mold and movable to and from the same and means to close the trimmer element on the mold after the plunger has compressed the material therein.

A further object of my invention is to combine with the mold a carrier element having a plurality of feeders adapted to be successively moved to and from the mold to convey material thereto and remove the molded article thereof and a plunger coacting with the mold and the successively effective feeders.

A further object of my invention is to effect an improvement in the construction of the plunger whereby a hollow block may be formed with an inwardly-projecting beveled flange at one side thereof and in which flange the material is by the action of the plunger compressed more densely than in other parts of the hollow block.

In the accompanying drawings, Figure 1 is a vertical longitudinal sectional view of a molding-machine embodying my improvements, the revolving feed-wheel or carrier and the feed-arms thereon being shown in elevation. Fig. 2 is partly a top plan view of the same and partly a horizontal section, taken on a plane indicated by the line *a a* of Fig. 1. Fig. 3 is a horizontal sectional view taken on a plane indicated by the line *b b* of Fig. 1 and showing certain of the gears which connect the power-shaft to the shafts which respectively operate the feed-wheel and the crank-shaft that operates the plunger and also showing the cam and coacting tappets which operate the longitudinally-movable table that actuates the laterally-movable sides of the mold and carries the feed-wheel. Fig. 4 is a vertical transverse sectional view taken on a plane indicated by the line *c c* of Fig. 2. Fig. 5 is a detail sectional view taken on a plane indicated by the line *d d* of Fig. 4. Fig. 6 is a sectional perspective view of a hollow block formed by my molding-machine.

In the embodiment of my invention I provide a suitable frame 1, which has guides 2 at its upper side, which guides support a longitudinally-movable table or base 3, the sides of which travel in the said guides. The said table or base is provided near one end with a pair of outwardly-diverging cam-slots 4. A feed element 5, here shown as a wheel having a series of radially-projecting arms 6, is mounted on and carried by the longitudinally-movable base or table. A vertically-disposed shaft 7 in the embodiment of my invention shown in the drawings has its bearing in the base or table, and the feed-wheel 5 is secured to the upper end of said shaft and rotated thereby. The shaft 7 carries a beveled gear-wheel 8 at its lower end, which beveled gear-wheel is keyed or otherwise firmly secured to the said shaft. The feed-arms 6 of the feed-wheel 5 have their outer ends provided with vertical flanges 9, each of which successively forms one side of the mold in which the tiles, building-blocks, bricks, or other articles are formed by the operation of the machine. Each of the said feed-arms 6 is provided at its outer end, preferably on its under side, with a projecting feed tray or slide 10, which when the mold is closed forms its bottom. The feed-arms 6 are provided with axial adjusting-slots 11. The bolts 12, which secure the inner ends of the feed-arms on the revoluble feed-wheel, are disposed in the said slots 11, and hence the feed-arms are radially adjustable on the feed-wheel, as will be understood.

On one end of the frame 1 and disposed transversely over the longitudinally-movable table or base 3 is a base or support 13, which is provided with guideways 14 near its inner side, which guideways extend transversely over the said table. The end walls or sides 15 of the mold have bases 16, which operate in the guideways 14, the end walls of the mold being movable toward and from each other, and the bases of the said end walls have depending tappets 17, here shown as antifriction-rollers, which engage the cam-slots 4 of the longitudinally-movable table 3, and hence when the latter is moved the end walls of the mold are moved toward or from each other by the coaction of the cam-slots and tappets, as will be understood. One of the walls of the mold, here shown as the outer wall 18, is rigid and immovable and is secured to or formed with the base 13, which carries the mold.

A pair of standards 19 rise from the mold-base 13 and are provided at their upper ends with bearings 20, in which is journaled a shaft 21. The said shaft has a crank 22, the wrist of which is midway between the said standards, and at one end of the said shaft is a miter gear-wheel 23. A cross-head 24 is movable vertically in guideways 25, with which the standards 19 are provided. The said cross-head is connected to the wrist of the crank 22 by a pitman 26, and it will be understood that when the crank-shaft 21 is rotated the cross-head will be alternately raised and lowered. One or more plungers 27 may be secured to the cross-head to depend from the lower side thereof and to be alternately moved downwardly into and upwardly from the mold to subject the tempered clay or other plastic material in the mold to pressure between the plunger and the sides of the mold in order to form the desired tile, building-block, brick, or other object in the mold.

The upper side of the mold is formed by a trimmer-plate 28, which is vertically movable above the walls or sides of the mold to allow excess material to be forced outwardly between the trimmer-plate and the sides or walls of the mold when the plunger is forced downwardly in the mold and displaces the plastic material therein and exerts such pressure between the sides or ends of the mold and the interior of the mass of material as to form the latter of the required shape in the mold. The trimmer-plate is provided with outwardly-projecting arms 29, which bear against the inner sides of the standards 19 and are pivoted thereto, as at 30. Any other preferred means may, however, be used to retain the trimmer-plate in its correct position with relation to the mold and permit of the recession of the trimmer-plate from the mold when the material in the latter is being molded, and I do not limit myself in this particular. A spring, one or more, of suitable construction, here shown at 31, is employed to bear downwardly on the trimmer-plate and keep the latter normally closed on the upper side of the mold.

A vertically-disposed shaft 32 is journaled in suitable bearings 33 on one of the standards 19 and in one side of the guideway 2, which supports the longitudinally-movable bed or table 3. At the upper end of said shaft is a miter gear-wheel 34, which engages the similar wheel 23 on the crank-shaft 21, and at the lower end of said shaft 32 is a beveled gear-wheel 35, which is alternately engaged and disengaged by a beveled segment-gear 36 on a power-shaft 37, which is continuously revolved while the machine is in operation, a single revolution being intermittently imparted to the shafts 32 21 during a portion of each revolution of the power-shaft 37, said shafts 21 32, after completing a revolution, remaining stationary after the segment-gear 36 has disengaged the segment-gear 35 and while the power-shaft completes its revolution, as will be understood. The power-shaft 37 is journaled in bearings 38, with which the frame 1 is provided. The power-shaft may be actuated by any suitable means. I show a belt-pulley 39 of usual form on one end of the power-shaft for this purpose.

A suitable connection is provided between the power-shaft and the longitudinally-movable table or base 3 to communicate motion to the latter and to the feed element carried thereby. I here show a cam 39ª of suitable form on the said power-shaft and show the longitudinally-movable base or table 3 provided on its under side with a depending arm 40, which has tappets 41, here shown as antifriction-rollers, disposed in contact with the periphery of the cam.

The power-shaft 37 is further provided with a segment-gear 42. A longitudinally-disposed counter-shaft 43 is journaled in suitable bearings 44, with which the frame 1 is provided, and said counter-shaft has a beveled gear 45, which is alternately engaged and disengaged by the gear 8 as the table or base 3, together with the feed-wheel carried thereby, is moved in opposite directions during the operation of the machine, and the said counter-shaft 43 has a segment-gear 46, which is alternately engaged and disengaged by the gear 42.

The operation of my improved molding-machine is as follows: Initially the plungers are raised from the mold and the table or base 3 is run outwardly to cause the end walls 15 of the mold to recede from each other and the feed-wheel to be moved outwardly from the mold, so that its rotating gear 8 is brought into engagement with the gear 45. On the initial movement of the power-shaft its segment-gear 42 is in engagement with the segment-gear 46, and thereby the feed-wheel is partly rotated sufficiently to cause one of its feed-arms, on the tray or slide 10 of which has been placed a sufficient quantity of tempered clay or other plastic material, to be disposed opposite the mold, at which instant the segment-gear 42 disengages the segment-gear 46, arrests the rotation of the latter, and hence arrests the rotation of the feed-wheel. Immediately thereafter the action of the cam 39ª and tappets 41 is such as to move the table 3 in the direction indicated by the arrow in Fig. 1, hence causing the arm of the feed-wheel which is disposed opposite the mold to be carried with the feed-wheel, which moves with the table 3, so that the slide or feed-tray of the said arm enters the lower side of the mold, thus placing the material on said tray or slide in the mold, and the motion of the table 3 in the said direction causes the cam-slots 4 and tappets 17 to move the end walls 15 of the mold toward each other, thereby closing the laterally-movable walls of the mold, the inner side of the mold being closed by the flange or wall 9 of the feed-arm. The cam 39ª has a concentric portion 39ᵇ, which by engagement with the tappets 41 retains the table or base 3 in the position thereof which effects the closing of the laterally-movable walls of the mold. While the mold is thus closed the segment-gear 36 of the power-shaft 37 engages the gear 35 and imparts a single rotation to the shaft 32 and the crank-shaft 21, thereby causing the plunger to descend, enter the mold through the opening 28ª in the trimmer-plate, and thereafter reascend to the position shown in Fig. 1. It will be understood that on the descent of the plunger in the mold the same enters the mass of plastic material therein, displaces the material, and exerts pressure internally in the mass, hence causing the same to be expanded laterally and to be shaped by the sides of the mold. While the plunger is descending, and thus pressing the material in the mold, the excess material, if any there be, is forced out from the mold between the upper edges of the walls thereof and the lower side of the trimmer-plate, the latter being by the upward pressure of the excess material raised sufficiently against the tension of the spring 31 to permit the escape of the surplus material. The size and shape of the opening 28ª in the trimmer-plate are such that the laterally shouldered or enlarged upper portion of the plunger by engagement with the sides of said opening just prior to the completion of the downstroke of the plunger causes the trimmer-plate to be forced downwardly with the plunger and onto the upper edges of the side walls of the mold, hence effectually trimming the article pressed and shaped in the mold. Immediately after the plunger is drawn upwardly from the mold the cam 39ª and tappet 41 return the sliding longitudinally-movable table or base 3 and the feeder or feed-wheel to their initial position, hence opening the sides of the mold, and the feed-wheel as it recedes from the mold carries the molded article therewith.

Each of the elements 6, as will be apparent from the foregoing description, constitutes a combined feed and delivery device.

It will be understood that since the plunger enters the mold the object formed in the mold is hollow. My improved molding-machine is especially adapted for making hollow pressed building-blocks of the form shown in Fig. 6, which is a sectional perspective view of the block. It will be observed that the plunger tapers downwardly and that the lower end thereof has its sides beveled at 27ª to form a taper 27ᵇ, and hence it will be understood that the blocks formed by the coaction of the mold and the plunger are formed with correspondingly-beveled flanges $b$ extending inwardly from the walls or shell of the block and that the upper surface of this flange is flush with one side of the block, which when the block is used in constructing a wall is the upper side thereof, and that the thickness of the flange is gradually and continuously reduced as it approaches the center of the opening $c$, formed in the block, by the operation of the plunger. It will be also understood that this construction of the plunger causes the material which forms the flange in the block to be subjected to a somewhat greater pressure than the material which forms the other portions of the blocks, so that the said flange is of greater density than the other portions of the block and is correspondingly stronger. This is necessary to enable the flange to withstand the stress to which it is subjected when the block is embodied in a structure. While this specific construction of the plunger is one feature of my invention and is specifically claimed herein, I would have it understood that the plunger and the mold may be modified as may be required to adapt the machine to make blocks, bricks, tiles, or other articles of various forms.

Having thus described my invention, I claim—

1. A mold having a feed element reciprocable and rotatable in a horizontal plane and constituting one of its sides.

2. A mold having a feed element reciprocable and rotatable in a horizontal plane and constituting its bottom.

3. A mold having a feed element reciprocable and rotatable in a horizontal plane and constituting its bottom and one of its sides.

4. A mold having movable end walls, a rigid back wall, and a feed element reciprocable and rotatable in a horizontal plane and constituting its bottom.

5. A mold having movable end walls, a rigid back wall, and a feed element reciprocable and rotatable in a horizontal plane.

6. A mold having a feed and delivery element reciprocable and rotatable in a horizontal plane and constituting its bottom and one of its sides.

7. A mold having movable end walls, a rigid back wall, and a feed and delivery element reciprocable and rotatable in a horizontal plane and constituting its bottom and front wall.

8. A mold having movable side and end walls, of which one forms a combined feed and delivery element, means for reciprocating and rotating the said element in a horizontal plane, and a plunger coacting with the mold.

9. A mold having movable end walls, a rigid back wall, and a rotary reciprocatory feed and delivery element constituting its bottom and front wall.

10. A mold having a feed element constituting its bottom and a trimmer element constituting its top.

11. A mold having a feed element constituting its bottom and one of its sides, and a trimmer element constituting its top.

12. A mold having a feed element constituting its bottom, and a spring-retracted trimmer element constituting its top.

13. A mold having a feed element constituting its bottom and one of its sides, and a spring-retracted trimmer element constituting its top.

14. A mold having a feed element constituting its bottom, a trimmer element constituting its top, and a plunger to enter the trimmer element.

15. A mold having a feed element constituting its bottom and one of its sides, a trimmer element constituting its top, and a plunger to enter the trimmer element.

16. A mold having an axially-adjustable feed element constituting its bottom.

17. A mold having an axially-adjustable feed element constituting its bottom and one of its sides.

18. The combination with a contractile mold and a plunger to enter the same, of a yieldable trimmer element forming the top of the mold and means to close and lock the trimmer element against the mold coincident with the completion of the compressing stroke of the plunger.

19. The combination with a contractile mold and a plunger to enter the same, of a yieldable trimmer element forming the top of the mold, said element having an opening through which the plunger is adapted to pass, and means on the plunger to engage the said element at the completion of the compressing stroke of the plunger to close and lock the said element against the mold.

20. In combination with a mold having a fixed side, a movable element having cams, laterally-movable members forming the ends of the mold and operatively connected with the cams, guides for the ends of the mold, and a feed member carried by the movable element and forming one side of the mold.

21. In combination with a fixed mold open on one side, a revoluble feed element movable to and from the mold, said element having a member to close the open side of the mold, a plunger, and means to operate the same.

22. In combination with a fixed mold open on one side, a revoluble element movable to and from the open side of the mold, and a radially-adjustable feed element carried by the revoluble element and adapted to close the open side of the mold.

23. In combination with a mold, a plunger to enter the same and laterally displace and compress material therein, the plunger being provided at its lower end with a bevel to form a beveled flange in the hollow article formed, and to impart added density to the said flange.

In testimony that I claim the foregoing as my own I have hereto affixed my signature in the presence of two witnesses.

ERASTUS SIMMONS LAFFERTY.

Witnesses:
RUTH A. DAVIS,
BERTHA SEARLE.